Jan. 10, 1950     H. A. JONARD ET AL     2,494,244
COMMUTATOR-CONNECTOR

Filed March 18, 1948     3 Sheets-Sheet 1

INVENTORS
HOWARD A. JONARD
MARVIN H. POLZIN
BY R H Waters
ATTORNEY

INVENTORS
HOWARD A. JONARD
MARVIN H. POLZIN
BY
R H Waters
ATTORNEY

*INVENTORS*
HOWARD A. JONARD
MARVIN H. POLZIN

BY

ATTORNEY

Patented Jan. 10, 1950

2,494,244

UNITED STATES PATENT OFFICE 2,494,244

COMMUTATOR-CONNECTOR

Howard A. Jonard and Marvin H. Polzin, Akron, Ohio, assignors to Goodyear Aircraft Corporation, Akron, Ohio, a corporation of Delaware Application March 18, 1948, Serial No. 15,526

12 Claims. (Cl. 171—322)

This invention relates to electrical connector devices, especially to devices of such type which are adapted to connect rotary members to stationary members for transmission of electrical current therebetween.

Heretofore, in testing rotational objects, such as tires and wheels so as to determine the strains and forces existing therein under load, it has been difficult to transmit the test data from the rotating test object to stationary test instruments. Normally, in making such tests, some type of electrical strain gauges has been associated with spaced sections of the test wheel and the changes in the current in or electrical impulses from such strain gauge or gauges have served to measure the forces in the test specimen. However, in transmitting such relatively weak electrical impulses, wherein the variations produced by changes in the stresses of the test specimen may be of very small intensity, it has been very difficult to prevent major interferences in the transmission of such test data by variations in resistance of the electrical transmission equipment. It has been especially difficult to provide effective slip rings or other means for transmitting current from the rotating test specimen to the stationary test instruments.

The general object of the present invention is to avoid and overcome the foregoing difficulties with and disadvantages of previous types of electrical connector devices of the class described and to provide a constant resistance connector device for transmitting electrical signals between a rotating and a stationary article.

Another object of the invention is to provide an efficient, low cost, easily maintained connector device for transmitting electrical impulses from a rotor to a stator.

A further object of the invention is to provide better test instruments whereby improved test data can be obtained from rotating objects.

A further object of the invention is to provide a circumferentially adjustable synchronizer device in a connector of the type described so that the test signals can be circumferentially correlated with a base or check impulse transmitted through the connector device.

The foregoing and further objects and advantages of the invention will be made more apparent as the specification proceeds.

Attention now is directed to the accompanying drawings wherein.

Figure 1:
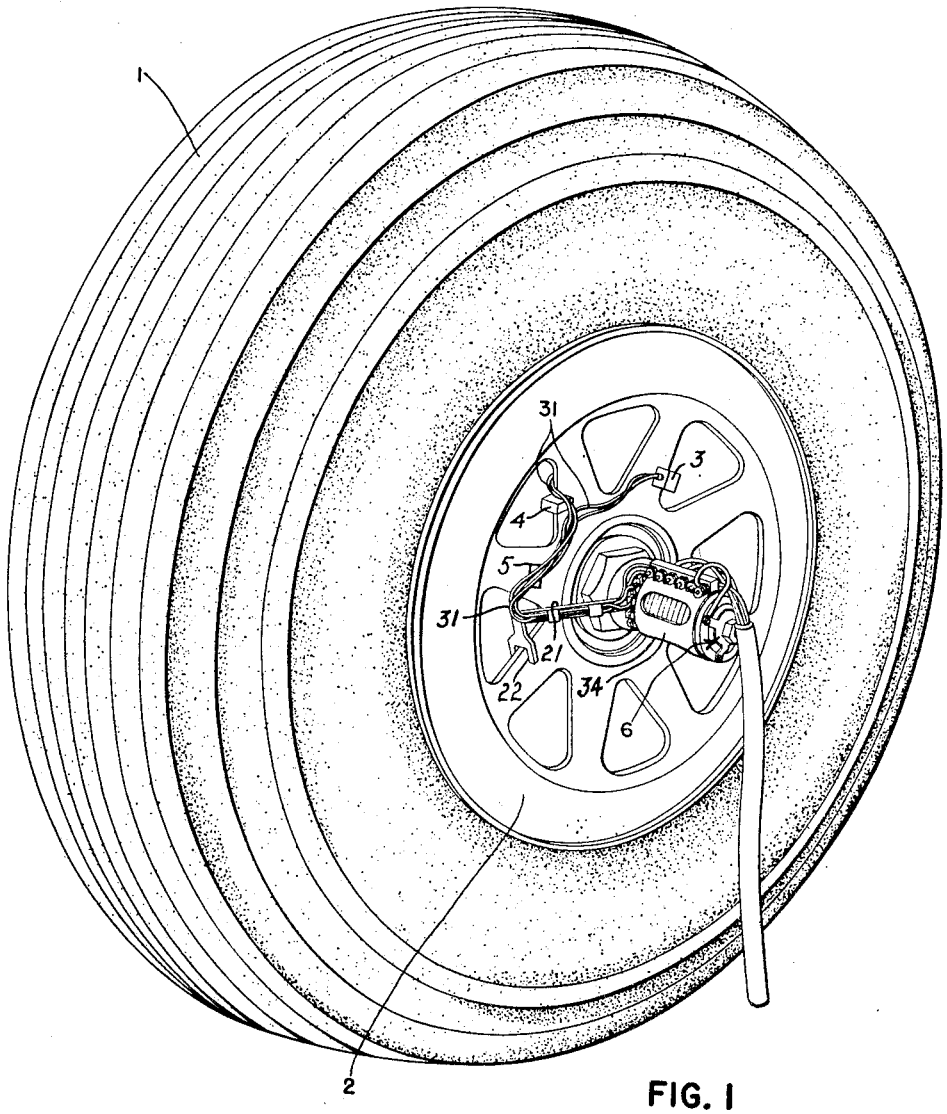
Fig. 1 is a perspective view showing a connector device embodying the principles of the invention mounted in operative association with a wheel from which test data is to be taken.

Referring now in more detail to the structure shown in the drawings, a conventional pneumatic tire 1 is mounted on a wheel 2 that is supported upon a suitable shaft on which the tire and wheel can be rotated as a unit. Any conventional means (not shown) can be provided to rotate the tire and wheel unit at desired speeds. The wheel 2 is shown as having stress-strain gauges 3, 4 and 5 of conventional construction secured thereto in any desired manner, which gauges are adapted to have electrical energy transmitted therethrough and to change such energy transmittal with variations in the stresses applied to the wheel 2 under different operating conditions. So as to withdraw, accurately, the signals from the gauges 3, 4 and 5, a connector device generally indicated by the numeral 6 is associated with the wheel 2 in fixed association with the means mounting such wheel for rotation.

Figure 2:
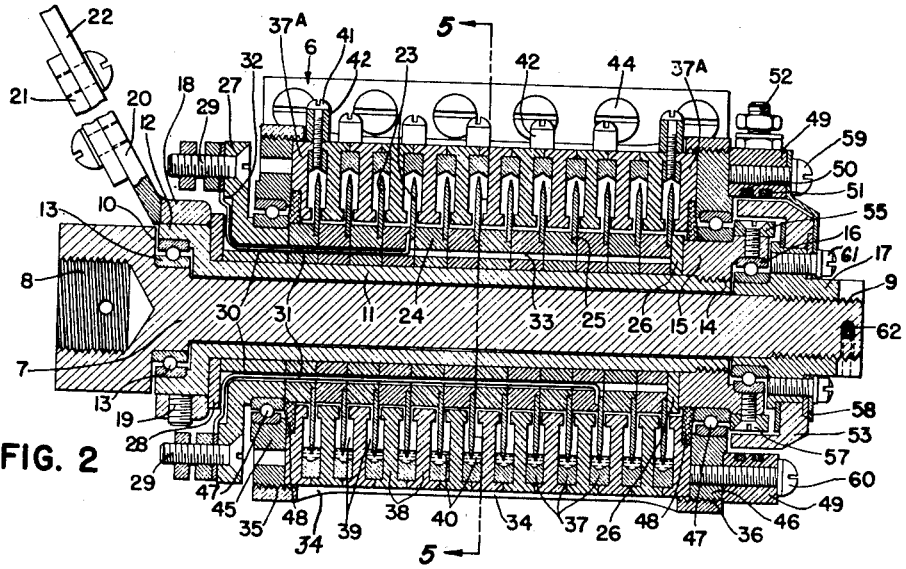
Fig. 2 is an enlarged longitudinal section of the connector device of Fig. 1.

The construction of the connector device 6 is best shown in Fig. 2 and it includes a shaft 7 that is adapted to engage with the wheel shaft, and to this end a tapped bore 8 is provided at one end of the shaft 7 whereas the opposite end of the shaft 7 is provided with threads 9. The bore 8 is provided in an enlarged portion of the shaft 7 which terminates in a shoulder 10. The connector device 6 includes a rotary section which is adapted to rotate with the wheel 2 and this includes a rotor tube 11 which has an enlarged end section 12. This end section 12 is adapted to receive therein a circumferential bearing 13 which seats against the outer portion of the shoulder 10 of the shaft 7 and is retained intermediate the rotor tube 11 and the shaft 7 so as to journal the rotor tube thereon. The other end of the rotor tube 11 is provided with threads 14 on its outer surface and it engages with a ring nut 15 which is adapted to provide an outer seat for a second bearing 16 that is carried by a nut 17 which engages with the outer threaded portion 9 of the shaft 7 so that the rotor tube 11 is provided with a bearing at each end thereof for rotatably supporting it on the shaft 7. The rotor tube 11 is connected to the wheel 2 by means of a ring 18 that is secured to the end section 12 of the rotor tube 11 by means of one or more set screws 19. The ring 18 has an arm 20, which may be welded thereto, extending fixedly therefrom and this arm 20 is removably secured by a strap 21 to a bent mounting arm assembly 22 which is adapted to engage with any desired means, such as a C-clamp, not shown, which will secure the arm assembly 22, and the rotor portion of the device 6, to the wheel 2 for rotation therewith.

In order to provide means for transmittal of electrical pulses and currents to and from the rotor tube 11 and its associated members, a plurality of electro-conductive disks 23 are carried by the rotor tube. These rotor disks 23 are separated from each other by means of insulating spacers 24, one of which is positioned adjacent a corresponding face of each of the disks 23. Fig. 2 best shows that corresponding peripheral portions of the insulating spacers 24 are recessed as shown at 25 so that the disks 23 can extend radially inwardly with relation to the outer periphery of the insulating spacers 24 but that such insulating spacers can be substantially abutted against the adjacent insulating spacers whereby the disks can be compressed therebetween and form a unit therewith. An insulator washer 26 is provided at the outer end of the assembly of the disks 23 and insulating spacers 24 and it bears against and is compressed by the ring nut 15 on the outer end of the rotor tube 11. A rotor terminal ring 27 is provided on and carried by the inner end of the rotor assembly and it is spaced from the ring 18 and the end section 12 of the rotor tube by an insulating washer 28. The rotor terminal ring 27 carries a plurality of terminal posts 29 thereon with as many terminal posts being provided as there are channels in the connector. The terminal ring 27 has a plurality of axially directed apertures 30 therein for receiving conductors 31. Each conductor 31 extends through one of the apertures 30 and connects to an individual terminal post 29. A substantially radially extending recess 32 may be formed on the inner surface of the rotor terminal ring 27 to receive the conductors 31 and permit the terminal ring to be abutted against the washer 28. Each of the insulating spacers 24 is provided with a plurality of circumferentially spaced apertures 33 therein which are adapted to be aligned longitudinally of the connector device when the insulating spacers are in their assembled relationship. Hence, the conductors 31 individually extend through the aligned apertures 33 with each of the conductors 31 being connected to an individual rotor disk 23 in any conventional manner, as indicated in Fig. 2.

The stator portion of the connector device 6 sends electrical current to certain of the disks 23 whereas other disks send current to portions of the stator device so that a circuit to and from of the gauges is provided. The stator portion of the connector device includes a shell 34 which has tapped end sections 35 and 36. The shell receives therein a stator ring 37 for each of the disks 23. Preferably the stator rings 37 are formed from copper and they are positioned in radially spaced but adjacent relationship with the disks 23 by means of insulating spacer rings 38. The insulating spacer rings 38 are of substantially I shape in radial section and the radially outer ends of same are adapted to be abutted against each other to form elongate, radially extending chambers 39 intermediate each pair of adjacent insulating spacer rings. A stator ring 37 is positioned in each of the chambers 39 and one of the rotor disks 23 also extends into each chamber. The base portions of the insulating spacer rings 38 are of such size as to be closely positioned adjacent the rotor disks 23 whereas the radially outer ends of the spacer rings abut against each other to close that portion of the stator. Fig. 2 also shows that the radially inner portions of the insulating spacer rings 38 are positioned immediately adjacent the peripheries of the insulator spacers 24 for the rotor.

Figure 5:
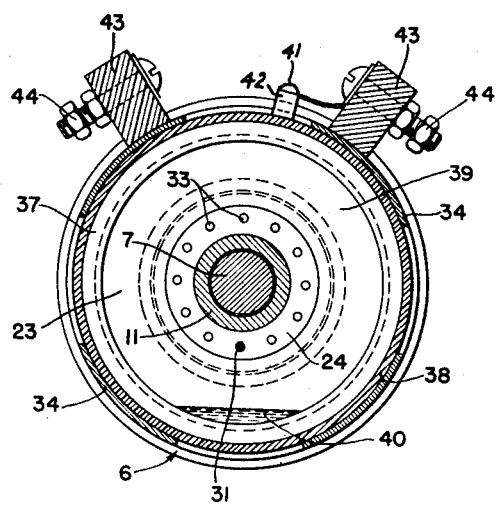
Fig. 5 is a transverse section taken on line 5—5 of Fig. 2.

As a salient feature of the invention, a substantially constant resistance connector is provided for transmitting current from each of the rotor disks 23 to and from each of the stator rings 37. As best shown in Fig. 5, this connector comprises a pool 40 of conductive liquid which is received in and retained in each of the chambers 39. This pool 40 of liquid preferably comprises mercury. Only a small volume of mercury is required in each chamber, as indicated in the drawing, and one edge portion of the disk 23 will be continuously immersed in same. It has been established that by forming the disks 23 and stator rings 37 both from copper and by the use of a mercury connector pool, no excess of detrimental oxidation or other chemical action takes place so that a constant resistance connector is provided between the rotor and stator portions of the connector device. The mercury is normally retained in the chambers 39 due to the substantially closed construction thereof and by positioning the device 6 horizontally.

In order to deliver current to and from each stator ring 37 an elongate screw 41 is engaged with each of the stator rings 37. The screw 41 extends through an insulating bushing 42 and through the spacer rings 38 into a tapped hole in each ring 37. A conventional wire connector electrically joins each screw with a terminal block 43 that extends longitudinally of the connector device and is provided with individual terminal posts 44 thereon for each of the stator rings. In this instance, two terminal blocks 43 will be provided with six terminal posts on each block to take care of the twelve conductive disks provided in the connector device. Fig. 2 of the drawing shows that the end insulator spacer rings 37ᵃ are of general C-shape in section and that end caps or lock members 45 and 46 engage with the tapped end sections 35 and 36, respectively, of the shell 34 for retaining the stator rings and spacer rings in engagement and forming a unit therefrom. Bearings 47 of any conventional construction are associated with the radially inner portions of the end caps 45 and 46 for journaling the rotor assembly therewithin. So as to seal the rotor joint between the stator assembly and the rotor assembly, seal washers 48 are positioned at the ends of the stator assembly and are in tight radial engagement with the rotor assembly. These washers 48 may also be secured in place by the end caps 45 and 46.

Figure 3:
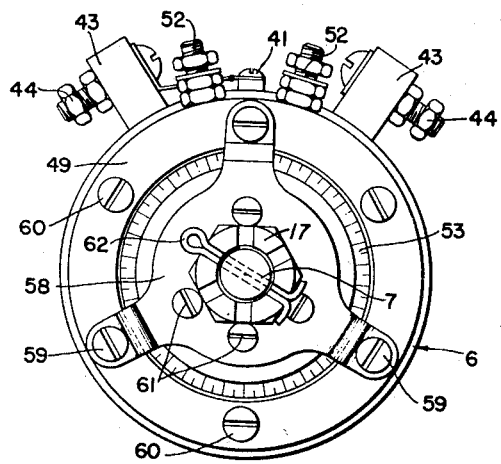
Fig. 3 is an end elevation of the device of Fig. 2.
Figure 4:
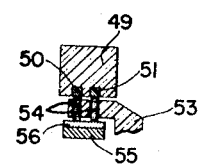
Fig. 4 is a fragmentary section of the connector means in the adjustable synchronizer device.

A further feature of the invention resides in an adjustable synchronizer device which may be provided on the connector device 6. This synchronizer device permits a base or check signal to be transmitted through the connector device and is capable of circumferential adjustment whereby such base signal can be obtained at any desired angular instant of rotation of the testing wheel so that the test signals and data can be correlated with regard to load and rotation. The synchronizer means include a synchronizer ring 49 which carries two slip rings 50 and 51 embedded in its radially inner surface. The synchronizer ring 49 also carries a pair of terminal posts 52 which individually connect to one of the slip rings 50 and 51 so that any desired electrical generator can be connected to the terminal posts for transmittal of the energy to the slip rings 50 and 51. Fig. 4 best shows the detailed construction and use of the synchronizer portion of the apparatus and it shows that a synchronizer dial ring 53 is positioned radially within the synchronizer ring 49. This synchronizer dial ring 53, as shown in Fig. 3, is calibrated into angular degrees on its axially outer face and is rotatably carried by the connector device as hereinafter described in detail.

The synchronizer dial ring 53 carries a pair of radially extending connector springs 54 that extend therethrough. These connector springs 54 are compressed into position so that their outer ends engage, individually, with one of the slip rings 50 and 51 whereas the inner ends of the connector springs 54 bear on a synchronizer contactor ring 55. The contactor ring 55, like substantially all of the components of the connector device, is formed from an insulating material, such as suitable plastic, but it has positioned therein a connector block 56 that extends axially thereof. This block 56 is of such size that it is adapted to engage with both of the connector springs 54 when the contactor ring and synchronizer dial ring are in such relative circumferential positions that the contactor block and springs are radially aligned. At such instant, the contactor block 56 provides a connection between the connector springs 54 whereby a circuit is formed through the synchronizer ring and associated means and an impulse will be transmitted therethrough.

Fig. 2 of the drawings shows that the contactor ring 55 may have a plurality of screws 57 extending therethrough for securing the contactor ring to the ring nut 15 that aids in holding the rotor assembly together. The synchronizer dial ring 53 is carried by the stator portion and is adapted to be retained frictionally in a given position by means of a support spider 58 which bears thereon. The spider 58 is secured to the synchronizer ring 49 by screws 59 whereas screws 60 secure the synchronizer ring 49 to the end cap 46 of the stator assembly. The spider 58 is secured to the nut 17 by means of screws 61 whereas a cotter pin 62 may be provided for locking the nut 17 in engagement with the shaft 7.

From the foregoing, it will be seen that a connector device for transmitting current from the rotor to a stator is provided and that such connector device will be adapted to function efficiently and effectively without variation in operative resistance over appreciable periods.

Figure 6:
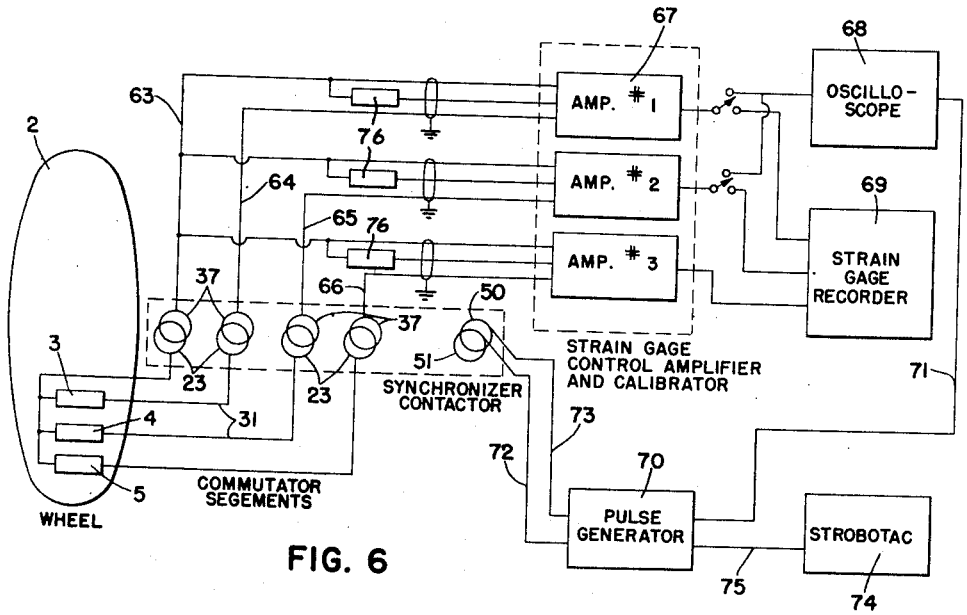
Fig. 6 is a diagrammatic circuit for the connector device of the invention.

One illustration of the circuit in which the device of the invention can be used is illustrated in Fig. 6 wherein the electric strain gauges 3, 4 and 5 are shown mounted on a wheel 2 with conductor leads 31 extending therefrom. In known manner, the gauges 3, 4, and 5 are secured to the several parts of the wheel which are stressed in use, and the resulting strains in the wheel are likewise imparted to the gauges whose electrical resistance is thereby changed. These changes can be electrically measured and calibrated in terms of strain. In order to achieve this result, the conductor leads 31 connect to the disks 23 which in turn are associated with stator rings 37. Leads 63, 64, 65 and 66 extend from the stator rings and connect same to individual gauge amplifier means 67 with one lead 63 being common to all amplifier circuts. The gauges 3, 4 and 5 are thus, respectively, in the input circuits of the respective amplifiers 67, electric current from the input circuits passing through the gauges. A compensating gauge 76 may also be connected to the common lead 63 and connect to each of the amplifier means 67 with the other gauges 3, 4 and 5. From the amplifier, the test data obtained then may be led to test instruments, such as an oscilloscope 68, or a strain gauge recorder oscillograph 69. The oscilloscope 68 usually should be connected to a pulse generator 70 by means of a lead 71. This pulse generator 70 also is connected to the synchronizer portion of the connector device 6 through leads 72 and 73 which are shown as connecting to the associated slip rings 50 and 51 whereby a pulse from the pulse generator will only be transmitted to the oscilloscope at desired points of rotation. The pulse generator also connects to a strobotac 74 by a lead 75. It will be understood by those skilled in the art that the slip rings 50—51 make contact only for a short arc in one complete revolution of the wheel 2 to thereby flash the strobotac, close the sweep circuit of the oscilloscope, or perform other selected operations at any adjusted point of the wheel revolution.

Having thus described our invention, what we claim is:

1. In electro-conductive test apparatus, the combination of a rotating member from which electrical test data is to be withdrawn, a shaft member on which said rotating member is positioned, a stationary instrument member, and a connector device for accurately transmitting electrical current from the rotating member to the stationary instrument member, said device including a shaft adapted to be associated with said shaft member, a rotor tube positioned in telescoped engagement with said shaft, means journaling said rotor tube on said shaft, a plurality of conductive disks, a plurality of insulating spacers associated with said disks to space them from each other and to position them on said rotor tube to form a unit therewith, said insulating spacers having axially directed apertures therein, a rotor terminal ring engaged with one portion of said rotor tube, connector means extending through the apertures in said insulating spacers and connecting said rotor terminal ring to the individual members of said rotor disks positioned on said rotor tube, terminal means carried by said rotor terminal ring for transmitting current to and from the connector device to said rotating member, a plurality of stator rings one of which is positioned adjacent the margins of each of said rotor disks, a plurality of insulating spacer rings positioned intermediate said stator rings and forming therewith an enclosed chamber for each of said rotor disks, said chambers being relatively narrow and being of relatively long radial length in a plane perpendicular to said rotor tube, each of the chambers formed by said stator rings being provided with a pool of mercury into which said rotor disks extend, terminal means associated with said stator rings for connecting to said stationary instrument member, and means for securing said stator rings to said shaft for positioning them stationarily with relation thereto.

2. In electro-conductive test apparatus, the combination of a rotating member from which electrical test data is to be withdrawn, a shaft member on which said rotating member is positioned, and a connector device for accurately transmitting electrical current from the rotating member to a stationary member, said device including a shaft adapted to be associated with said shaft member, a rotor tube positioned in telescoped engagement with said shaft, means journaling said rotor tube on said shaft, a plurality of conductive disks, a plurality of insulating spacers associated with said disks to space them from each other and to position them on said rotor tube to form a unit therewith, a rotor terminal ring engaged with one portion of said rotor tube, connector means connecting said rotor terminal ring to the individual rotor disks positioned on said rotor tube, terminal means carried by said rotor terminal ring for transmitting current to and from the connector device to said rotating member, a plurality of stator rings one of which is positioned adjacent the margins of each of said rotor disks, a plurality of insulating spacer rings associated with said stator rings and forming therewith an enclosed chamber for each of said rotor disks, said chambers being relatively narrow and being of relatively long radial length in a plane perpendicular to said rotor tube, each of the chambers formed by said stator rings and spacer rings being provided with a pool of mercury into which said rotor disks extend, terminal means associated with said stator rings, and means for securing said stator rings to said shaft for positioning them stationarily with relation thereto.

3. In electro-conductive test apparatus, the combination of a rotating member from which electrical test data is to be withdrawn, a shaft member on which said rotating member is positioned, a stationary instrument member, and a connector device for accurately transmitting electrical current from the rotating member to a stationary member, said device including a shaft adapted to be associated with said shaft member, a rotor tube journaled on said shaft, a plurality of conductive disks, a plurality of insulating spacers associated with said disks to space them from each other, means for securing said disks and spacers to said rotor tube to form a unit therewith, a rotor terminal ring engaged with one portion of said rotor tube, connectors connecting said rotor terminal ring to the individual rotor disks positioned on said rotor tube, a plurality of conductive stator rings one of which is positioned in adjacent association with the margins of each of said rotor disks, a plurality of insulating spacer rings associated with said stator rings and forming therewith an enclosed chamber for each of said rotor disks, each of the chambers formed by said stator rings and spacer rings being provided with a pool of mercury into which said rotor disks extend, terminal connector means associated with said stator rings, and means for securing said stator rings to said shaft for positioning them stationarily with relation thereto.

4. A connector device for transmitting electricity from a rotor to a stator, said device comprising a stator member having a longitudinal axis and a relatively narrow elongate annular recess formed therein in a plane perpendicular to such axis, a rotor received in said stator member and extending in a direction parallel to the longitudinal axis thereof, a conductive disk carried by said rotor and extending into the recess in said stator member, said stator member having a pool of mercury retained in said recess and with said disk extending thereinto, means for supplying electrical energy to said disk, and contact means associated with said stator member and connecting to said mercury pool for receiving electrical current therefrom.

5. A connector device for efficiently transmitting electricity from a rotor to a stator, said device comprising a stator member having a longitudinal axis and an annular recess formed therein in a plane substantially perpendicular to such axis, a rotor received in said stator member and extending along the longitudinal axis thereof, a conductive disk carried by said rotor and extending into the recess in said stator member, said stator member having a pool of a conductive liquid retained in said recess and with said disk extending thereinto, and contact means associated with said stator member and connecting to said pool for receiving electrical current therefrom and transmitting current thereto.

6. In a connector device for transmitting relatively weak electrical impulses accurately from a rotating member to a stator member, the provision of a plurality of contact disks, a plurality of insulating spacers positioned intermediate adjacent disks and on opposite sides of said disks to form a rotor therewith, said insulating spacers having a plurality of circumferentially spaced axially aligned apertures formed therein, conductor means received in said axially aligned apertures and with one conductor means in contact with only one of said disk members, and terminal means associated with said rotor and individually connected to said conductor means.

7. In a connector device for transmitting electrical impulses from a rotating member to a stator member, the combination of a plurality of contact disks, a plurality of insulating spacers positioned intermediate adjacent disks and on opposite sides of the end disks, means securing said disks and spacers together to form a rotor member therefrom, a conductor connecting to each of said disk members, and terminal means associated with said rotor member and connected to said conductors.

8. In a connector device for transmitting relatively weak electrical impulses accurately from a rotating member to a stator member, the combination of a rotor having a plurality of conductive disks extending therefrom, a stator having a recess adapted to receive said disks therein, said recess having pools of conductive liquid therein into which said disks extend, a plurality of conductor means insulated from each other and extending axially of said rotor with one means connecting to one said disk, and conductive means associated with said stator and connecting to said pools.

9. In apparatus as in claim 6, a synchronizer shell associated with said stator member, a pair of slip rings associated with said synchronizer shell in non-conducting relationship to each other, a contact member associated with said rotor, and conductive connector means circumferentially adjustably positioned between said synchronizer shell and said contact member whereby the angular relationship between said rotor and said stator member can be varied to vary the relative angular position therebetween at which said contact completes the circuit between said slip rings whereby electrical impulses can be obtained at a desired rotational angle of said rotor.

10. In a connector device for transmitting relatively weak electrical impulses accurately from a rotating member to a stator member or vice versa, the combination of a rotor having a conductive disk extending therefrom, a stator adapted to receive said disk therein, and a localized pool of conductive liquid received in said stator and receiving a localized but changeable portion of said disk therein for transmittal of current to and from said rotor.

11. A connector device as in claim 6 wherein said disk and contact means are formed from copper, and said conductive liquid is mercury.

12. In a commutator, a rotor, a stator, a synchronizer shell carried by said stator, a pair of slip rings carried by said synchronizer shell in non-conducting relationship to each other, a contact carried by said rotor, and conductive connector means circumferentially adjustably positioned between said synchronizer shell and said contact member for connecting said slip rings to said contact whereby the angular relationship between said rotor and said stator can be varied to vary the relative angular position therebetween at which said contact completes the circuit between said slip rings whereby electrical impulses can be obtained at a desired rotational angle of said rotor.

HOWARD A. JONARD.
MARVIN H. POLZIN.

REFERENCES CITED

The following references are of record in the file of this patent:

UNITED STATES PATENTS

| Number | Name | Date |
|---|---|---|
| 523,998 | Rennerfelt | Aug. 7, 1894 |
| 2,108,624 | Thearle | Feb. 15, 1938 |
| 2,325,144 | March | July 27, 1943 |